Feb. 17, 1959   H. G. KEPNER   2,873,834
HYDRAULIC CLUTCH OPERATING MECHANISM
Filed July 19, 1956   4 Sheets-Sheet 1

Inventor.
Hugh G. Kepner.
By Wilkinson, Huxley, Byron & Hume
Attys.

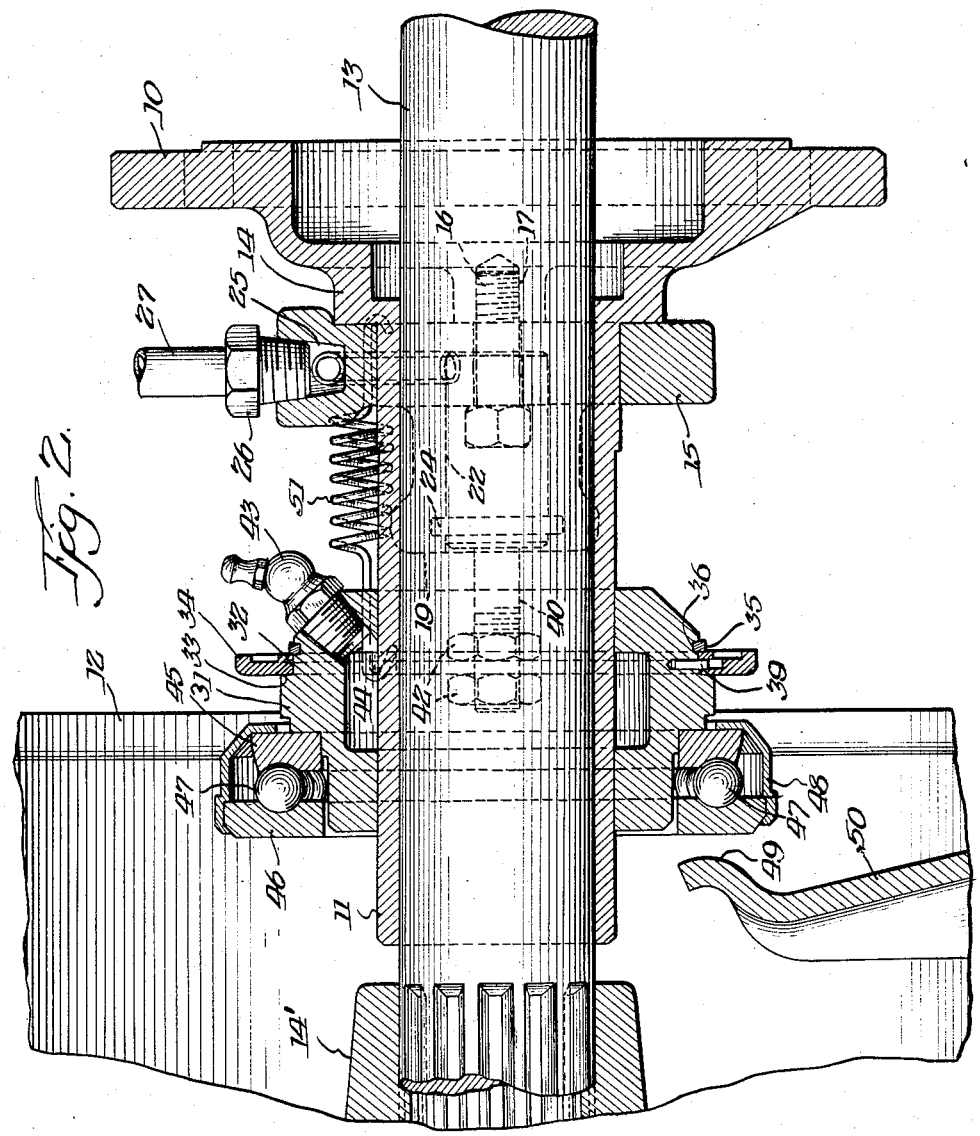

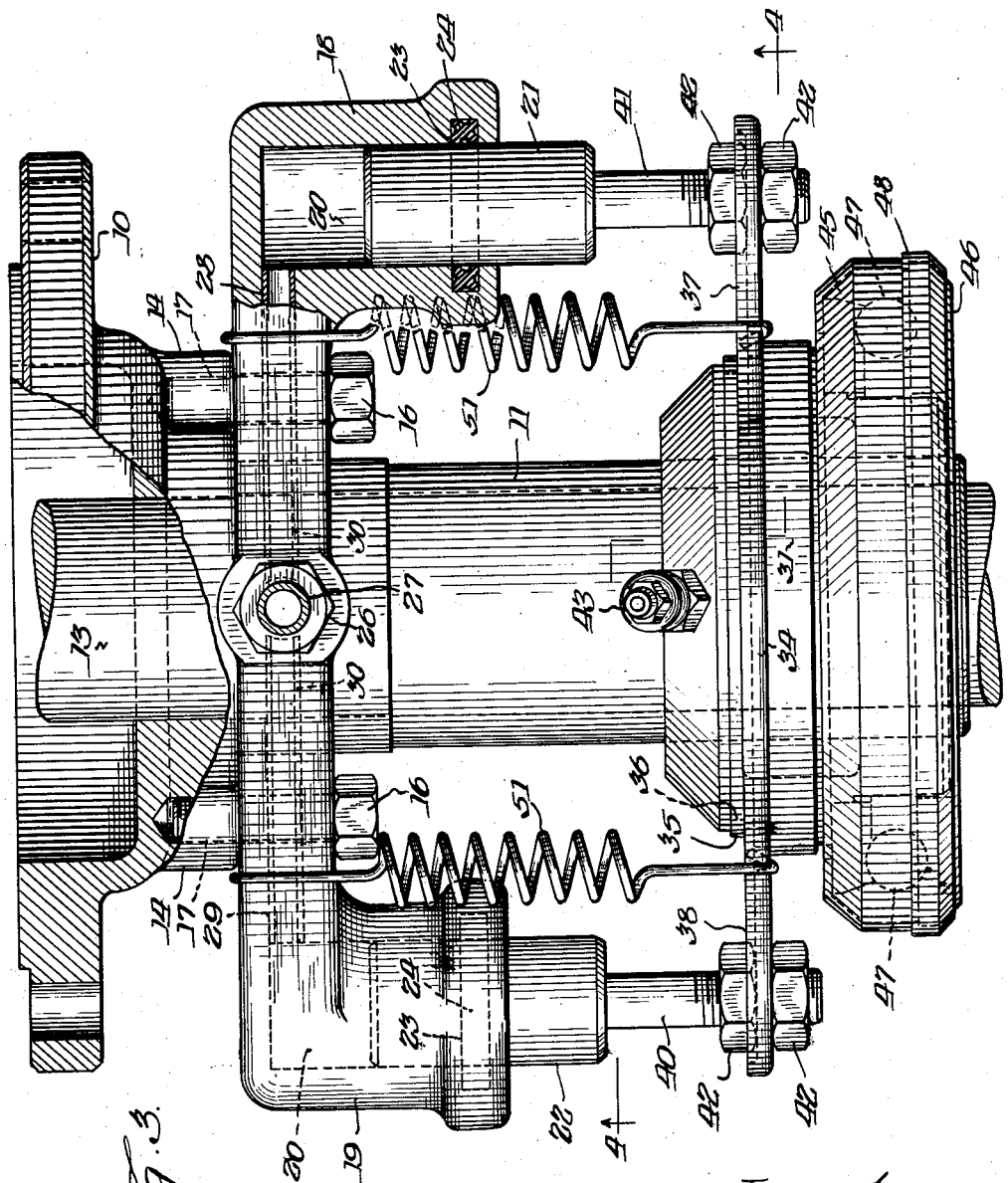

Feb. 17, 1959          H. G. KEPNER          2,873,834
HYDRAULIC CLUTCH OPERATING MECHANISM
Filed July 19, 1956          4 Sheets-Sheet 4
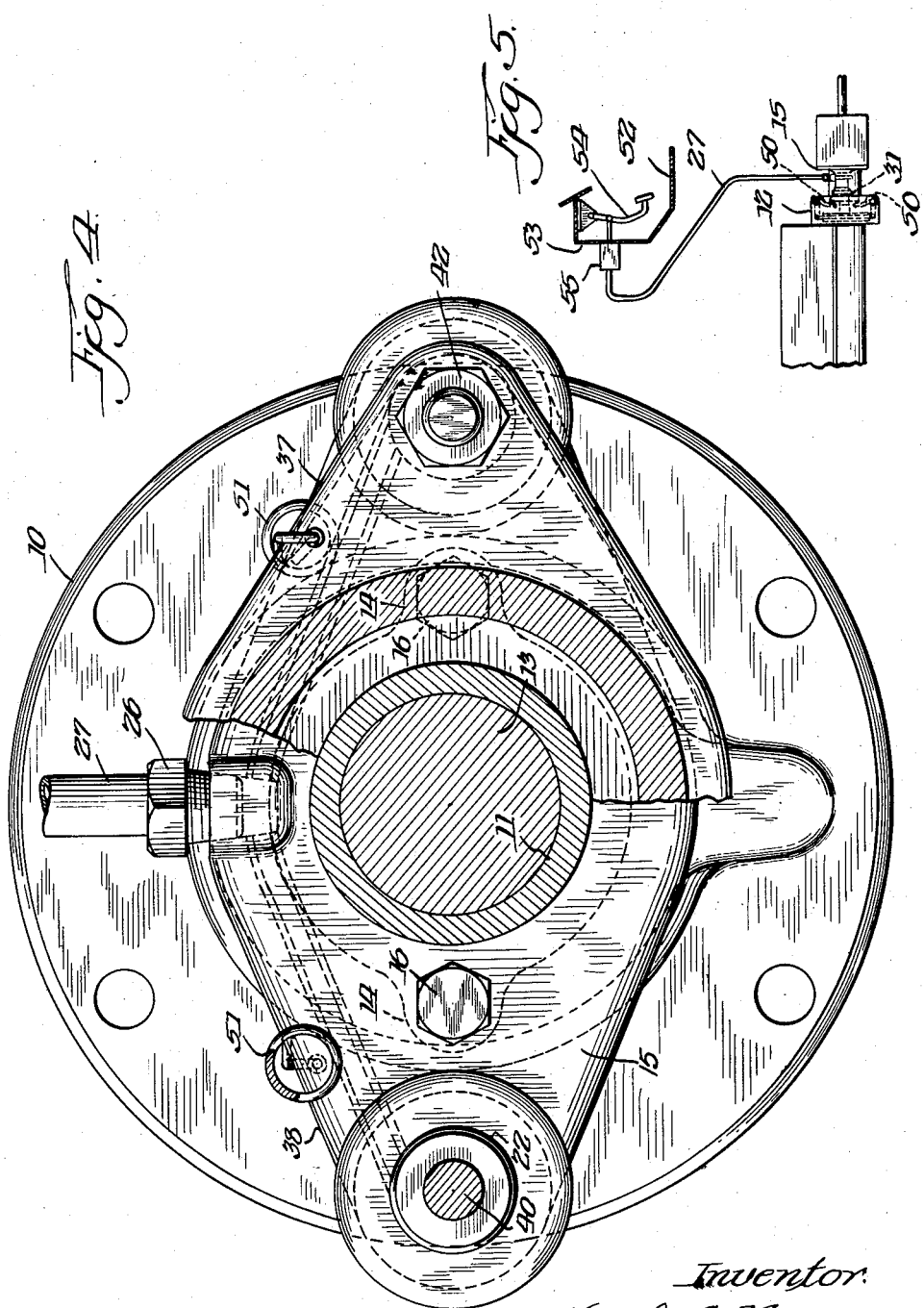

United States Patent Office 2,873,834
Patented Feb. 17, 1959

2,873,834

HYDRAULIC CLUTCH OPERATING MECHANISM

Hugh G. Kepner, Summit, Ill.

Application July 19, 1956, Serial No. 598,893

2 Claims. (Cl. 192—91)

My invention relates to a hydraulic actuator mechanism for a vehicle clutch and has particular reference to a mechanism for actuating the clutch mechanism used primarily for trucks, heavy vehicles, and the like, in connection with manually operated transmission system while the gears comprising the transmission system are changed through various stages depending upon the speed of the vehicle.

Another object of my invention is the provision of a clutch actuating mechanism which is accurate in its application of force necessary to declutch a motor from the transmission system and in which a minimum amount of wear is possible and in which mechanical adjustments are reduced to a minimum once an installation is completed because any operation involving the replacement of a clutch in a motor vehicle or its operating parts is such a major task that a truck is taken out of commission for a considerable period of time resulting in the loss of its use in service.

Clutch actuator mechanisms of various mechanical and hydraulic kinds have been in use which generally comprise a series of links, bell crank levers, clevis connections, and the like, which are connected usually to a foot pedal located in the cab of the truck and which is connected to the clutch actuating mechanism in such a manner that pressure on the foot pedal normally declutches the motor from the transmission mechanism. The movement of the bearing slide for applying the necessary force to the clutch fingers to declutch the motor must be in an exact and straight linear direction and not canted for proper functioning of the mechanism and likewise the bearing mechanism through which the force is applied to the clutch operating fingers must be exactly perpendicular to the plane of rotation of the clutch fingers else the pressure disc is not freely separated from the clutch plate; the rotating parts of the clutch are apt to drag resulting in unequal wear of the various parts so that the clutch mechanism wears quickly and to such an extent that failure of operation results.

In mechanism systems, a forked member is usually pivotally mounted in such manner that a sliding bearing member is brought into engagement with the clutch fingers to disengage the pressure plate from the dry plate of a standard clutch construction. The tips of the work wear unevenly causing the fork to cant to one side or the other, also because of wear the fork may be angularly shifted resulting in undue wear of the clutch parts and an ultimate break down of the clutch, all of which is avoided through the use of my improved construction.

My improved clutch actuator provides means whereby force is applied to the ends of the clutch fingers in a plane perpendicular to the plane of rotation of these fingers, and the means by which this force is applied to the fingers is actuated in a direction parallel with the axis of the power shaft running from the clutch to the transmission mechanism so that wear on any of the parts due to the angularity of position is avoided and proper functioning of the device is always insured.

Another and further object of my improved hydraulic clutch actuator mechanism is the provision of a hydraulically actuated pressure bearing mounted on an axis parallel to the power shaft extending from the clutch to the transmission gears which means is operated by a hydraulic actuated pump positioned close to a pedal in the cab of the truck so that power can be transmitted to the clutch actuator from the cab without the use of linkage, operating rods, and the like, through conduits extending from the pump to the clutch actuating mechanism thereby avoiding the mechanical linkage commonly used heretofore and which has been found objectionable.

These and other objects of my invention will be more fully and better understood by reference to the accompanying drawings wherein Figure 1 is a side elevational view showing the basic portions of the mechanism in position upon a truck.

Figure 2 is a longitudinal vertical sectional view taken through the mechanism shown in Figure 1.

Figure 3 is a top plan view of the device shown in Figure 1.

Figure 4 is a transverse sectional view taken on line 4—4 of Figure 3; and

Figure 5 is a diagrammatical view showing the application of the device to the power plant of a truck.

Figure 1:
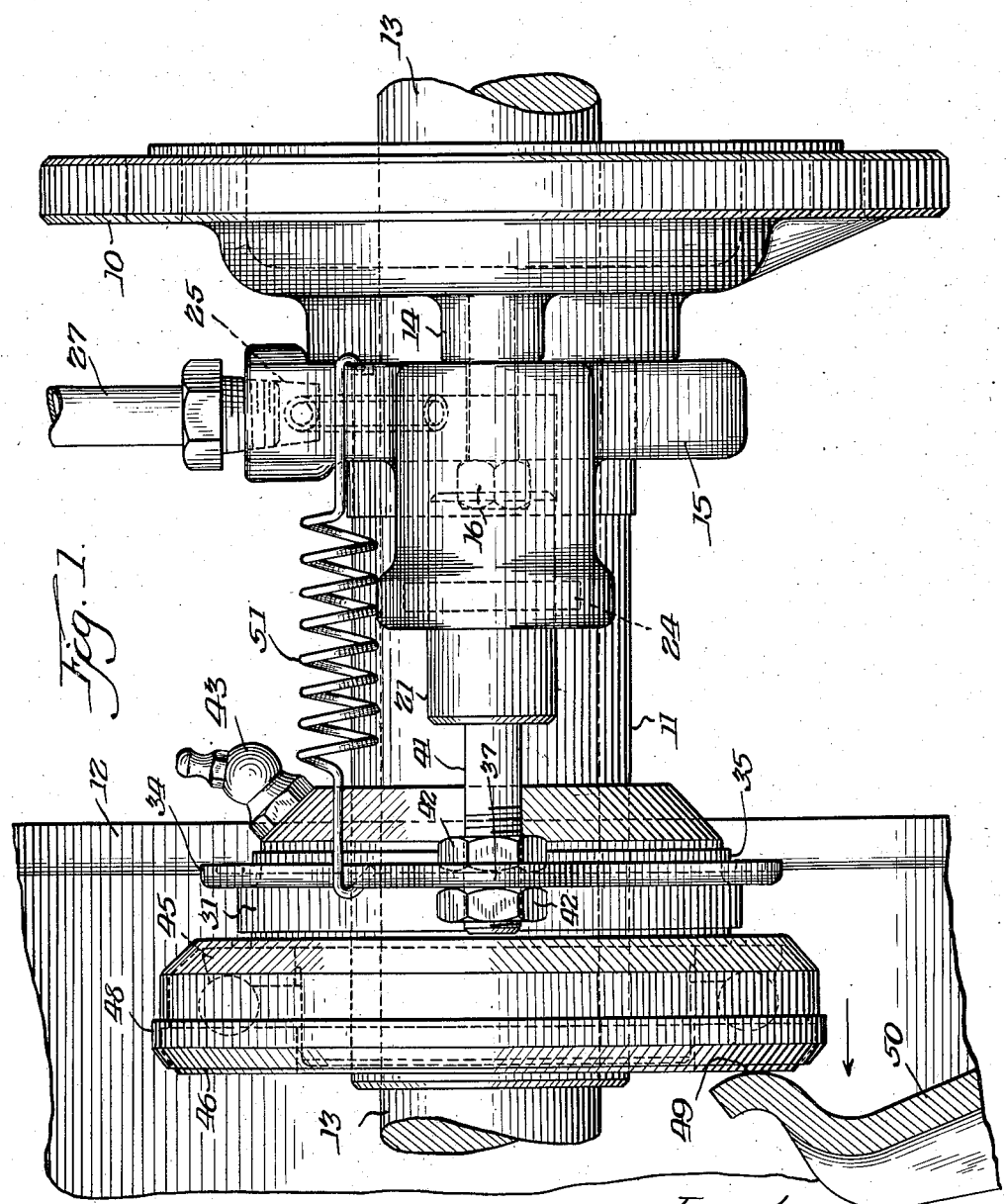

Referring now specifically to the drawings and in which like reference characters refer to like parts above, a front cover plate 10 of a transmission housing is shown having a tubular extension 11 thereon extending forwardly towards the motor compartment and into the bell housing 12 of the usual internal combustion engine, with a transmission power shaft 13 extending through the cylindrical member 11, with the rear end of the transmission shaft 13 extending into the transmission housing while the front end of the shaft 13 extends through and is splined to a hub 14' of the clutch plate which forms a part of the usual clutch mechanism, which said shaft extends entirely through the hub portion 14 and has its forward end usually mounted in the bell housing in a suitable manner, such mountings being common in motor assemblies and forms no part of my present invention.

A pair of bosses 14, 14 are provided on the forward side of the plate 10 to which is fitted the body member 15 of the hydraulic actuating unit, the member 15 being somewhat diamond shaped as shown in Fig. 4 of the drawings, with an opening therein through which the tube 11 extends, and is secured against the front face of the plate 10 by means of cap screws 16, 16 which extend through the body of the member 15 and into internally threaded openings in the bosses 14, 14 on opposite sides of the tubular member 11. A pair of cylinders 18 and 19 are integrally formed at the outer ends of the body member 15, each of said cylinders having chambers 20, 20 therein, with the cylinders 18 and 19 being open at their forward ends, and having pistons 21 and 22 therein, each of said cylinders 18 and 19 having circumferential channels 23, 23, therein adjacent their open ends within which quad rings 24, 24 are mounted which surround the pistons 21 and 22 and prevents the escape of hydraulic fluid from the chambers 20, 20 and provides seals for each of the pistons 21 and 22. The cylinders 18 and 19 with the chambers 20, 20 therein have their longitudinal axes parallel to and in precisely the same plane as is the axis of the tube 11 so the movement of the pistons are parallel with the longitudinal axis of the tube 11 and shaft 13. The pistons 21 and 22 are actuated in the cylinders 18 and 19 by hydraulic fluid under pressure, the movement of the pistons 21 and 22 must be equal producing an equal thrust in each side of the tube 11 and parallel to the axis thereof; and perpendicular to a cross-sectional plane through the tube 11 resulting in a direct thrust of each of these pistons for the declutching of the device as will be hereinafter described.

The body member has an opening 25 tapped in the upper side thereof within which a connecting member 26 is positioned, which has a pipe 27 connected thereto and leading to a foot actuating mechanism located in the cab of the truck as will be hereinafter described.

Internal passages 28 and 29 are provided in the body of the member 15 which extend from the opening 25 to the chambers 20, 20 located in the cylinders 18 and 19, and have pipes 30, 30 in the internal passages 28 and 29 in which hydraulic fluid under pressure passes to the chambers 20, 20 and behind the pistons 21 and 22.

The clutch release bearing mechanism is slidably mounted upon the tubular extension 11 of the cover plate 10 near the forward end thereof and comprises a bearing sleeve 31 slidably mounted on the tube 11 and having an annular seat 32 thereon which is adjacent an annular shoulder 33 with a driving member 34 comprising a circular center section fitted around the sleeve 31 on the seat 32 and against the shoulder 33 and held in position by a snap ring 35 which is fitted into a channel 36 extending around the sleeve 31 with the center section having extensions 37 and 38 at each side thereof. A shear pin 39 is provided which extends into the bearing sleeve 31 and into the driving member 34, which assists in holding the driving member 34 onto the sleeve 31 and in case of bearing failure as hereinafter described, the pin 39 is sheared permitting the sleeve 31 to rotate on the tubular extension 11, without causing damage to any of the operating parts.

Each of the pistons 21 and 22 has rods 40 and 41 projecting axially therefrom which rods are threaded at their outer ends and extend through openings in the ends of the extensions 37 and 38 respectively, of the driving member 34, with a pair of nuts 42, 42 being provided on each of the threaded ends of the rods 40 and 41 for engagement with the plate 38 on opposite sides thereof whereby the bearing sleeve 31 may be adjusted on the tubular extension 11 so that the bearing sleeve may be in proper adjusted relationship with respect to the operating clutch fingers and also for the purpose of adjusting the travel of the sleeve 31 on the tubular extension 11 with respect to the travel of the pistons 21 and 22 in the cylinders 18 and 19 or vice versa and also to take up any wear which may develop in the working parts.

An oil fixture 43 is provided by means of which a lubricant is forced into the internal annular space 44 in the bearing sleeve 31 so the external surface of the tubular extension 11 is properly lubricated to insure an easy sliding movement of the bearing sleeve 31 thereon. The forward end of the bearing sleeve 31 has an annular bearing member 45 mounted thereon in a press fit position over the bearing sleeve 31 and a bearing ring 46 being provided with ball bearings 47, 47 being provided between the members 45 and 46 and a retaining ring 48 being provided which holds the bearing ring 46 in position and freely rotatable with respect to the bearing member 45 and the bearing sleeve 31, the forward face of the bearing ring 46 being adapted to engage against the curved surface 49 of the clutch fingers 50, usually three in number, arranged in circular relationship at 120° apart and forming a part of the clutch in the form of levers with their outer ends usually being pivotally attached to the clutch housing and also having a connection with the press plate of the clutch, whereby a forward thrust on the inner curved ends 49 of the fingers moves the press plate of the clutch out of engagement with the plate forming a part of the clutch mechanism of which the hub 14' is a part and through the clutch plate is connected to the shaft 13 leading to the usual transmission members. The fingers 50 rotate in the same plane so as the bearing ring 31 is moved forward the bearing ring 46 engages the ends of the fingers in the same plane (Fig. 1) with an alined thrust thereby insuring that the plate of the clutch mechanism are evenly released. Tension springs 51, 51 are provided which are fastened at the rear ends to the member 15 and are secured at their front ends to the extensions 37 and 38 of driving member 34 so that upon the pressure being released in the cylinders 20, 20 the bearing sleeve 31 and the clutch release bearing thereon are drawn rearward and out of engagement with the ends of the clutch fingers 50 permitting the press plate on the clutch to again engage the usual clutch plate thereby allowing the clutch to resume engaged position. In the operation of the clutch in its engaged position, it is important that the end 49 of the clutch fingers 50 be out of engagement with the bearing ring 46 and in the normal adjustment of these parts, they are spaced at least one-eighth of an inch apart. As the faces of the clutch disks wear the ends of the fingers approach closer to the bearing ring 46, and if engagement takes place, either the faces of the surfaces of the fingers become worn, usually in an uneven manner, and the bearing ring does not function properly because of such wear, or the bearing ring wears so that it does not function properly. If the engagement of the fingers of the clutch is sufficient, then the bearing ring rotates and very soon wears to such an extent that it is no longer serviceable and must be replaced. Provision must be made therefore for a movement of at least five-eighths of an inch of the bearing sleeve 31 upon which the bearing ring 46 is mounted to insure that the clutch fingers 50 are always clear of the bearing ring 46 because as the clutch plates wear, the ends of the fingers approach closer to the bearing ring 46. Proper bearing ring adjustment can be quickly and accurately made by movement of the pairs of nuts 42, 42 on the ends of the piston rods 40 and 41 as the springs 51, 51 are sufficiently strong to retract the pistons 21 and 22 so they are bottomed in the cylinders 20, 20. The necessity for such adjustment can be determined by the driver of the truck when the backlash of the clutch operating pedal increases to any great extent beyond the usual operating backlash to which these manually operated backlash release mechanisms are usually set. When such adjustment becomes necessary, it can be made by a mechanic in a few moments without removing any of the parts and without taking the truck out of service except for a very short time. If for any reason the clutch finger bearing ring 46 in the bearing sleeve 31 fails to rotate, the shear pin 39 is sheared so the bearing sleeve 31 is free to rotate on the tubular extension 11 without damage to the various parts.

The hydraulic actuator for the device is shown in Fig. 5 and is also the subject matter of my co-pending application Serial No. 598,894 filed July 19, 1956, and in which the floor of the truck cab 52 is illustrated with a bulkhead 53 being provided to which a pivotally mounted foot pedal 54 is connected with a combined hydraulic pump and reservoir 55 being mounted against the bulkhead 53 and which has the outlet pipe 27 connected thereto and which leads to the connection 26 in the body member 15 through which hydraulic fluid is conveyed to the chambers 20, 20 in the cylinders 18 and 19 which imparts a forward thrust on the clutch release bearing assembly thereby releasing the clutch.

The operation of the device is quite simple and is accomplished preferably by a hydraulic foot pump such as shown and described in Figure 5 of the drawings and in which the combination of a pump and reservoir as shown and described in my co-pending application Serial No. 598,894 filed July 19, 1956, is used which comprises a pump from which hydraulic fluid is forced which passes under pressure through the pipe 27 to the connection 26 in the body member 15 where the hydraulic fluid divides and is forced to the cylinders 18 and 19 under equal pressure in each cylinder through the pipes 30, 30 in the passages 28 and 29, thereby moves the pistons 21 and 22 equally in a forward direction in a line parallel to the axis of the tubular extension because the pistons 21 and 22 are of equal diameters and the cylinders 20, 20 are also equal in diameter, results in equal pressure being applied to the bearing sleeve 31 through the arms 37 and 38 which move the sleeve 31 forward on the tubular extension 11 carrying with it the bearing member 45 and resulting in the bearing ring 46 engaging the ends 49 of the clutch fingers 50 in a plane precisely parallel to the longitudinal axis of the extension 11 and in a plane perpendicular to the plane of rotation of the ends 49 of the fingers 50, and which moves the fingers 50 forward thereby resulting in pulling the pressure plate forming a part of the clutch away from the usual drive plate resulting in declutching the engine from the transmission shaft 13 leading to the usual transmission mechanism. The longitudinal axes of the cylinders 18 and 19 and the pistons 21 and 22 are parallel with the axis of the tubular extension 11, so there is no canting or sidewise thrust exerted upon the sleeve 31 but as this sleeve 31 is moved forward in sliding engagement on the tubular extension 11 a balanced thrust is applied to the sleeve 31 so that any angular displacement is thereby avoided, the operation of the clutch is certain and the parts will have a long life because of the lack of any angular movement and lack of any friction which may develop due to such angular displacement of the parts. The bearing plate 46 rotates easily on the sleeve 31 with the bearing members forming a ball race for the reception of ball bearings 47 and through the use of the hydraulic mechanism the declutching operation is much more simple and much more easily accomplished than what has been possible heretofore through mechanical connections including a fork for the movement of the sleeve 31 thereby avoiding undue wear and making certain that the device operates properly. Upon the pedal 54 being released by the operator the tension springs 51, 51 exert their force upon the members 37 and 38 to which they are connected at their front ends, and because the springs 51, 51 are anchored to the member 15 at their rear ends, pull the sleeve 31 and bearing plate 46 rearwardly on the tubular extension 11, moving the bearing plate 46 out of engagement with the ends of the fingers 49 thereby releasing the pressure plate forming a part of the clutch and causing the clutch to be reengaged and connecting the motor with the transmission shaft 13 and thence to the transmission gearing. The tension of the springs 51, 51 is sufficient to force the hydraulic fluid back into the pump with sufficient pressure to cause the pedal 54 to resume its normal position, and bottoming the pistons 21 and 22 against the bottoms of each of the cylinders thereby providing a secure positioning of the pistons so the bearing plate 46 can be accurately spaced from the clutch fingers to provide proper clearance between these parts to prevent undue wearing which adjustment can beasily be made by moving the nuts 42, 42, on each of the pistons. The cycle of operation has been completed and the device has moved through a complete cycle of declutching and reengagement of the clutch connecting the engine with the transmisison gearing. It will be understood, of course, that this device is primarily adapted for trucks having a manual operating gear shifting mechanism so that as the clutch is disengaged, the operator, through manual shifting of the gears, can make the proper selection of gears for transmitting the power of the engine to the wheels of the truck.

While I have described more or less precisely the details of construction, I do not wish to be understood as limiting myself thereto, as I contemplate changes in form, the proportion of parts and the substitution of equivalents as circumstances may suggest or render expedient without departing from the spirit or scope of the invention.

What is claimed is:

1. Hydraulic clutch operating mechanism for motor vehicles comprising in combination with a transmission housing having a tubular extension thereon, a sleeve movably mounted on the said tubular extension and having laterally projecting extensions thereon, a rotatably mounted bearing member on the said sleeve and connected thereto and adapted to engage the clutch fingers of a motor vehicle, a hydraulic member fixed on said tubular extension, and spaced from the said sleeve, fixed cylinders carried by said hydraulic member on each side of the tubular extension, the said hydraulic member having conduits therein leading to the said cylinders, pistons mounted in said cylinders in axial parallelism with the said tubular extension and perpendicular to the lateral extensions on the said sleeve, means adjustably connecting the said pistons to the lateral extensions whereby the said sleeve and bearing member are adjustably spaced from the clutch fingers, a hydraulic fluid supply, a pipe leading from the said hydraulic fluid supply to the hydraulic member through which hydraulic fluid is forced into the said cylinders and means whereby the said sleeve may be moved away from the clutch fingers and the pistons are bottomed in the cylinders.

2. Hydraulic clutch operating mechanism as defined by claim 1 and in which the adjustable means connecting the said pistons to the said lateral extensions consists of threaded piston rods, each forming a part of each piston, extending through the laterally projecting extensions and threaded pairs of spaced nuts on the threaded piston rods, and each pair of the nuts being in engagement with opposite sides of the said lateral extensions.

References Cited in the file of this patent

UNITED STATES PATENTS

| Re. 23,326 | Fleischel | Jan. 9, 1951 |
| 1,864,126 | Ferris | June 21, 1932 |
| 1,921,042 | Roos | Aug. 8, 1933 |
| 2,757,769 | Roise | Aug. 7, 1956 |

FOREIGN PATENTS

| 571,432 | Great Britain | Aug. 24, 1945 |
| 904,380 | Germany | Feb. 18, 1954 |

UNITED STATES PATENT OFFICE

CERTIFICATE OF CORRECTION

Patent No. 2,873,834                        February 17, 1959

Hugh G. Kepner

It is hereby certified that error appears in the printed specification of the above numbered patent requiring correction and that the said Letters Patent should read as corrected below.

Column 1, line 55, for "mechanism" read -- mechanical --; line 58, for "work" read -- fork --; column 5, line 56, for "beasily" read -- easily --.

Signed and sealed this 16th day of June 1959.

(SEAL)
Attest:

KARL H. AXLINE
Attesting Officer

ROBERT C. WATSON
Commissioner of Patents